United States Patent
Crisp et al.

(10) Patent No.: US 9,719,212 B2
(45) Date of Patent: Aug. 1, 2017

(54) PROCESS TO IMPROVE PERFORMANCE OF WET-STRENGTH RESINS THROUGH BASE ACTIVATION

(71) Applicant: Solenis Technologies, L.P., Schaffhausen (CH)

(72) Inventors: Mark T Crisp, HS Leusden (NL); Michael A Evans, Wilmington, DE (US); Ashley H Lewis, Wilmington, DE (US); Jeffrey Hubert Peltier, Kenneth Square, PA (US); Bryan K Spraul, Wilmington, DE (US); Richard J Riehle, Wilmington, DE (US)

(73) Assignee: SOLENIS TECHNOLOGIES, L.P. (CH)

( * ) Notice: Subject to any disclaimer, the term of this patent is extended or adjusted under 35 U.S.C. 154(b) by 0 days.

(21) Appl. No.: 14/825,605

(22) Filed: Aug. 13, 2015

(65) Prior Publication Data

US 2016/0047090 A1    Feb. 18, 2016

Related U.S. Application Data

(60) Provisional application No. 62/036,727, filed on Aug. 13, 2014.

(51) Int. Cl.
| | | |
|---|---|---|
| *D21H 21/20* | (2006.01) | |
| *D21H 11/20* | (2006.01) | |
| *D21H 17/55* | (2006.01) | |
| *C08G 73/02* | (2006.01) | |
| *D21H 17/46* | (2006.01) | |
| *D21H 17/52* | (2006.01) | |
| *D21H 17/56* | (2006.01) | |
| *C08L 79/02* | (2006.01) | |

(52) U.S. Cl.
CPC ........... *D21H 21/20* (2013.01); *C08G 73/022* (2013.01); *C08G 73/0286* (2013.01); *C08L 79/02* (2013.01); *D21H 11/20* (2013.01); *D21H 17/46* (2013.01); *D21H 17/52* (2013.01); *D21H 17/55* (2013.01); *D21H 17/56* (2013.01)

(58) Field of Classification Search
CPC .......... D21H 11/20; D21H 17/55; D21H 21/20
USPC ...................................................... 162/164.3
See application file for complete search history.

(56) References Cited

U.S. PATENT DOCUMENTS

| | | | |
|---|---|---|---|
| 4,388,439 A | 6/1983 | Maslanka | |
| 4,929,309 A | 5/1990 | Bachem et al. | |
| 5,017,642 A | 5/1991 | Hasegawa | |
| 5,019,606 A | 5/1991 | Marten et al. | |
| 5,972,691 A | 10/1999 | Bates et al. | |
| 6,197,919 B1 * | 3/2001 | Crisp | C08F 220/04 528/230 |
| 6,429,267 B1 | 8/2002 | Riehle | |
| 6,554,961 B1 * | 4/2003 | Riehle | C08G 73/022 162/164.3 |
| 6,908,983 B2 | 6/2005 | Maslanka | |
| 7,081,512 B2 | 7/2006 | Riehle | |
| 7,175,740 B2 | 2/2007 | Riehle et al. | |
| 8,399,544 B2 | 3/2013 | Varnell et al. | |

OTHER PUBLICATIONS

March, Jerry John Wiley & Sons, Advanced Organic Chemistry, 3rd Ed., New York, pp. 218-236, 1985.
International Search Report, PCT/US2015/045046, Oct. 20, 2015, p. 1.

* cited by examiner

*Primary Examiner* — Mark Halpern
(74) *Attorney, Agent, or Firm* — Michael Herman; Joanne Rossi

(57) ABSTRACT

Provided is a process for improving the performance of wet-strength resins, such as polyaminopolyamide-epichlorohydrin resins, by treatment with a base to increase molecular weight to provide improved wet strength.

19 Claims, 2 Drawing Sheets

1)Wet and dry tensile strengths were linearly normalized to a basis weight of 40lbs/3000 sq. ft.

PROCESS TO IMPROVE PERFORMANCE OF WET-STRENGTH RESINS THROUGH BASE ACTIVATION

This application claims the benefit of U.S. provisional application No. 62/036,727, filed 13 Aug. 2014, the entire contents of which are hereby incorporated by reference.

BACKGROUND OF THE INVENTION

The present invention relates to a polyaminopolyamide-epichlorohydrin (PAE) resin and its use in papermaking. It also relates to a process of activating wet strength resins through treatment with a base improving the wet strength performance of the PAE resin.

Wet strength is useful in a wide variety of paper grades, including tissue, toweling, packaging and publication and laminating grades. Wet strength is useful in a wide variety of applications, some examples of which are facial tissue, kitchen towel, milk and juice cartons, paper bags and recycled liner board for corrugated containers.

Dry strength is another important paper property, particularly in light of the trend for paper manufacturers to use recycled fibers in paper in order to achieve lower costs. Wet strength resins can also provide increased dry strength to paper.

Commercially, polyaminopolyamide-epichlorohydrin (PAE) resins are used extensively as wet-strength additives. Commercial PAE resins can contain 1-10% (dry basis) of 1,3-dichloropropanol (1,3-DCP) and 3-chloropropanediol (also known as 3-CPD, 3-MCPD or CPD), which are by-products of the epichlorohydrin (epi). These epi by-products are carcinogenic and are closely regulated. For example, under the European regulation on Registration, Evaluation, Authorization and Restriction of Chemicals (REACH), 1,3-DCP is considered to be a Substance of Very High Concern (SVHC). As such, wet-strength resins that contain more than 1000 ppm of 1,3-DCP cannot be manufactured or imported into the European Union. Production of wet-strength resins with reduced levels of epi by-products has been the subject of much investigation. Environmental pressures to produce wet-strength resins with lower levels of absorbable organic halogen (AOX) species have been increasing. "AOX" refers to the absorbable organic halogen content of the wet strength resin which can be determined by means of adsorption of the halogen onto carbon. Accordingly, AOX includes epichlorohydrin (epi) and epi by-products (1,3-dichloropropanol, 2,3-dichloropropanol and 3-chloropropanediol) as well as organic halogen bound to the polymer backbone (polymer-bound AOX). Polymer-bound AOX includes aminochlorohydrin functionality and polymer-bound CPD (CPD-ester), which is a by-product of the reaction of epi with an acid end-group on the polyaminopolyamide.

Several ways of reducing the quantities of epihalohydrin by-products and polymer-bound AOX have been devised. Reduction in the quantity of epihalohydrin used in the synthetic step is an alternative. Control over the manufacturing process is another option yielding compositions of reduced concentration of hydrolysis products. Post-synthesis treatments are also known. It is also known that epichlorohydrin and epichlorohydrin hydrolyzates can be reacted with bases to form chloride ion and polyhydric alcohols. Bases can be used during the synthetic step to reduce organo chlorine contents of wet strength composition to moderate levels. U.S. Pat. No. 5,019,606 and U.S. Pat. No. 4,929,309 teach reacting wet strength compositions with an organic or inorganic base and then stabilizing against gelation with acid.

Still further, U.S. Pat. No. 5,972,691 discloses the treatment of wet strength compositions with an inorganic base after the synthesis step (i.e., after the polymerization reaction to form the resin) has been completed and the resin has been stabilized at low pH, to reduce the organo halogen content of wet strength compositions (e.g., chlorinated by-products) to moderate levels (e.g., about 0.5% based on the weight of the composition). The composition so formed can then be treated with microorganisms or enzymes to economically produce wet strength compositions with very low levels of free epihalohydrins and epihalohydrin by-products.

U.S. Pat. No. 7,175,740, assigned to Hercules Incorporated, teaches either an acid treatment, base treatment or an enzyme treatment to destroy polymer-bound CPD (e.g., CPD-ester). U.S. Pat. No. 7,081,512 teaches a base treatment. However, both these base treatments are followed by acid addition to produce a gelation stable resin.

Moreover, U.S. Pat. No. 6,429,267, assigned to Hercules Incorporated, which is herein incorporated by reference in its entirety, discloses amongst other features, a process for reducing the AOX content of a starting or initial water-soluble wet-strength resin comprising azetidinium ions and tertiary aminohalohydrin, which includes treating a starting or initial resin having a Gardner-Holdt viscosity of "C" or higher at 20% solids, in aqueous solution with base to form a treated resin, wherein at least about 20 mole % of the tertiary aminohalohydrin present in the starting resin is converted into epoxide and the level of azetidinium ion is substantially unchanged, and the effectiveness of the treated resin in imparting wet strength is at least about as great as that of the starting wet-strength resin.

U.S. Pat. No. 8,399,544, assigned to Hercules Incorporated, which is herein incorporated by reference in its entirety, discloses adhesive compositions which use a high solids, low viscosity PAE resin.

Each of the foregoing approaches has provided various results, and there has been a continuing need for further improvement in performance and AOX in polyamine-epihalohydrin resin-based compositions, such as wet strength agents, dry strength agents, creping adhesives, and wood product adhesives. There also remains a need for polyamine-epihalohydrin resins and polyamine-epihalohydrin resin compositions having high solids content and providing higher performance (e.g., higher wet/dry strength) and very low AOX, as well as paper products and wood product comprising such resins.

Higher wet strength and higher wet/dry strength is an unmet need for industry. For example, achieving higher wet/dry strength would allow paper manufacturers to provide products (e.g., kitchen towel) with higher wet strength to meet consumers' demands. Additionally, paper manufacturers can further modify the pulp furnish (e.g., adding more hard wood pulp, such as eucalyptus pulp) to lower manufacturing costs while increasing the softness of their products.

The present invention, relates to a process of activating a PAE resin to a target molecular weight, measured via viscosity, and subsequent dilution to a stable form. The activated or treated resin exhibits significantly improved performance over the starting resin and exhibits greater performance than standard PAE resins at addition levels greater than 1%.

Therefore, in addition to the benefit of very low AOX, it also can achieve the unmet need to achieve higher wet strength and higher wet/dry strength than achievable with current technology.

Additionally, the present process can achieve the unmet need of allowing PAE resin manufacturers to ship a REACH compliant, gelation stable, high solids resin, saving shipping and environmental costs while still having a resin that is easily pumped at high solids due to its relatively low viscosity for a high solids resin.

All of the references noted above are herein incorporated by reference in their entirety.

SUMMARY OF THE INVENTION

The present invention is directed to a process for improving the wet strength performance of paper products using a water-soluble wet-strength resin comprising azetidinium ions and tertiary aminochlorohydrin.

In one aspect of the invention there is provided an aqueous solution of at least 8% solids of an initial or starting water-soluble wet-strength resin having an RSV of less than about 0.25 dL/dry gram and may be less than 0.20 dL/dry gram and comprising from about 10 mole % to about 40 mole % azetidinium ions and from about 60 mole % to about 90 mole % tertiary aminohalohydrin. The water-soluble resin can be selected from polyaminopolyamide-epichlorohydrin resins, polyalkylene polyamine-epichlorohydrin resins, and mixtures thereof. The aqueous solution of the water-soluble resin is then treated with a base to a pH of from about 13.0 to about 11.0 and a temperature of from about 30° C. to about 60° C. for from about 20 minutes to about 4 hours, thereby forming an aqueous solution of a treated or activated resin, wherein the resin has an RSV of greater than about 0.35 dL/g, and wherein at least about 95% of the tertiary aminohalohydrin present in the starting resin is converted to epoxides. The terms "initial water-soluble resin" and "starting water-soluble resin" are used interchangeably throughout the specification and are meant to mean the same thing. Also, the terms "treated water-soluble resin", "final water-soluble resin" and "activated resin" are also used interchangeably throughout the specification and are meant to mean the same thing.

In some aspects of the present invention the treated water-soluble resin has 150% or more in wet strength performance compared with the wet strength of the initial or starting resin and improvements in wet-strength performance of 200% or more has been realized.

DETAILED DESCRIPTION OF INVENTION

Figure 1:
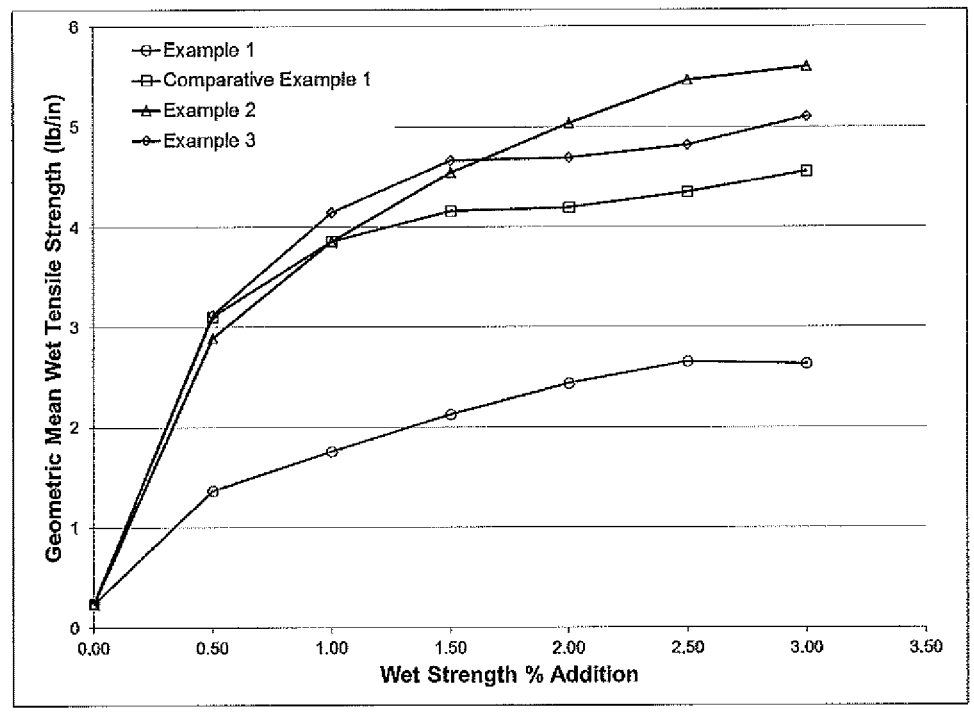
FIG. 1, illustrates the wet tensile strength of paper samples comparing an "unactivated" or initial resin added to a paper furnish versus an "activated" or treated resin that has been activated through treatment with a caustic.
Figure 2:
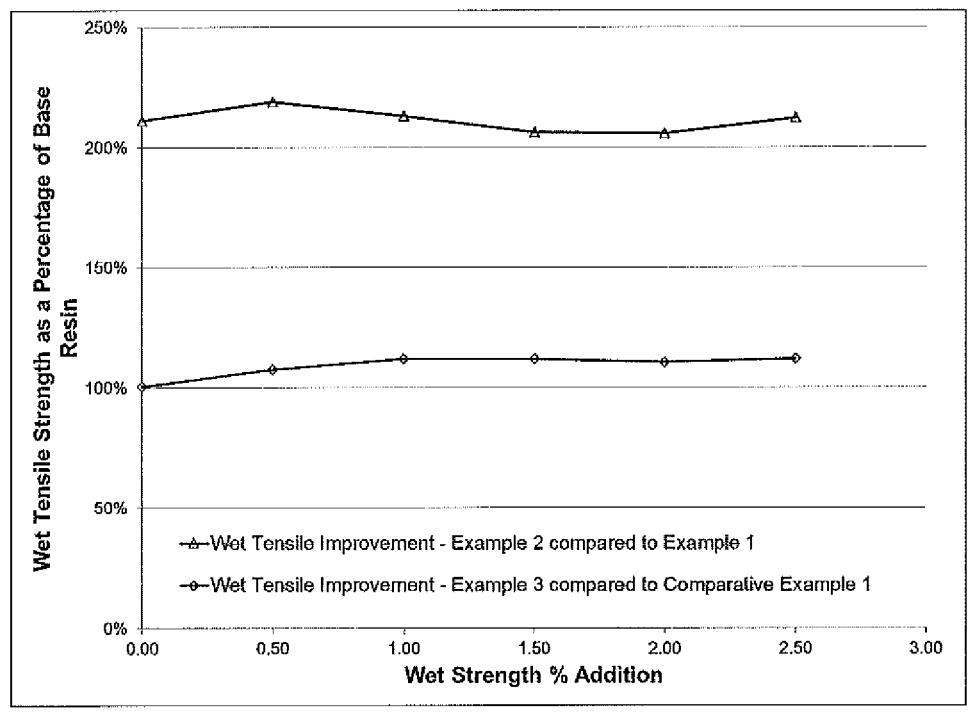
FIG. 2, illustrates the wet tensile strength of paper samples as a percentage of base resin comparing an "unactivated" or initial resin added to a paper furnish versus an "activated" or treated resin that has been activated through treatment with a caustic.

It has surprisingly been discovered that the performance of wet strength resins containing both azetidinium and aminochlorohydrin functionality can be greatly improved through a controlled activation reaction using a base treatment to achieve a target molecular weight, indicated by viscosity, and subsequent dilution. The "activated" or treated wet strength resin exhibits superior performance to current standard PAE resins used at higher addition levels due to the differences in the reactive functional groups.

In one aspect of the present invention, the starting or initial water-soluble wet-strength resins can be polyaminopolyamide-epihalohydrin resins or polyalkylene polyamine-epihalohydrin resins and mixtures thereof. The starting or initial wet-strength resin, which is also termed untreated or starting PAE resin refers to the resin before base treatment. With this process, a high solids PAE resin can be shipped to a customer and activated on site (in mill), greatly reducing shipment costs while providing improved performance to the customer.

In another aspect, the conversion of the tertiary aminochlorohydrin (ACH) of the wet-strength resins to tertiary epoxide and resulting crosslinking by base treatment can be illustrated by the following formula:

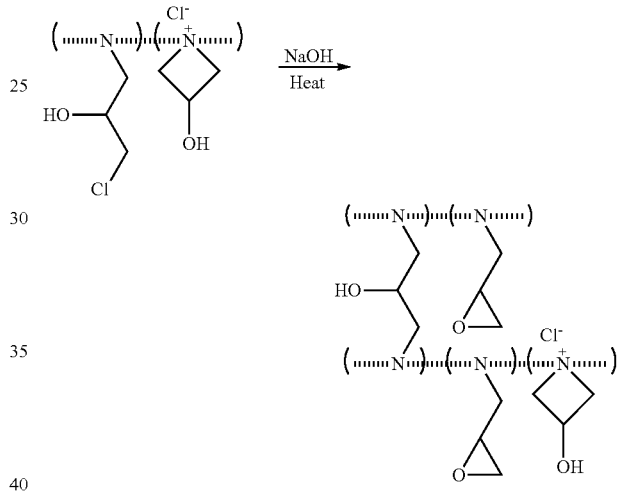

In another aspect of the present invention, high solids PAE resin is diluted with water, heated to a target temperature, aqueous base is added and the viscosity of the reaction mixture is monitored. At the target viscosity, the reaction mixture is diluted and is ready for use by the customer. The activated resin is preferably used less than 24 hours after dilution.

In one aspect of the invention there is provided an aqueous solution of at least 8% solids of an initial or starting water-soluble wet-strength resin having an RSV of less than about 0.25 dL/dry gram and may be less than 0.20 dL/dry gram and comprising from about 10 mole % to about 40 mole % azetidinium ions and from about 60 mole % to about 90 mole % tertiary aminohalohydrin. The water-soluble resin can be selected from polyaminopolyamide-epichlorohydrin resins, polyalkylene polyamine-epichlorohydrin resins, and mixtures thereof. The aqueous solution of the water-soluble resin is then treated with a base to a pH of from about 13.0 to about 11.0 and a temperature of from about 30° C. to about 60° C. for from about 20 minutes to about 4 hours, thereby forming an aqueous solution of a treated or activated resin, wherein the resin has an RSV of greater than about 0.35 dL/g, and wherein at least about 95% of the tertiary aminohalohydrin present in the starting resin is converted to epoxides. The terms "initial water-soluble resin" and "starting water-soluble resin" are used interchangeably throughout the specification and are meant to mean the same thing. Also, the terms "treated water-soluble resin", "final water-soluble resin" and "activated resin" are also used interchangeably throughout the specification and are meant to mean the same thing.

Without wishing to be bound by theory, wet strength performance increases as the level of reactive functionality increases and as the molecular weight increases. In a standard PAE resin, the most reactive functionality is azetidinium, which is cationic. Cationicity is important to allow the resin to be retained on pulp fibers when applied to the wet-end of a paper machine. At high dosages, the cationic demand of the pulp fibers is exceeded, resulting in a plateau of wet strength efficiency.

In another aspect, the present invention addresses key deficiencies of standard PAE resins by having reactive functionality not associated with the cationicity of the resin. It is believed that the current PAE resins have a higher level of more reactive tertiary aminoepoxide functionality, which does not have the "permanent" cationic charge of an azetidinium functionality, allowing more of the PAE resin to be retained in the paper furnish at higher dosages.

The cationic demand of a papermaking or pulp furnish (i.e., the anionic charge of the pulp furnish) is a factor that determines the level of standard PAE that can be retained in the furnish. In an aspect of the present invention, a benefit of the resin produced by the current process versus standard PAE resins can be realized at a dosage of about 0.25% (dry weight basis on dry weight of the pulp furnish), 0.5% or greater, 0.75% or greater, 1.0% or greater, 1.25% or greater, 1.5% or greater, and may be 1.75% or greater.

In another aspect of the present invention, the cationicity of the PAE resin can be adjusted by varying the aminochlorohydrin (ACH) and azetidinium (AZE) levels to better match the cationic demand of the pulp furnish and to achieve the target wet strength for the final product. In one aspect, the ratio of ACH:AZE can be about 30:70, about 40:60, about 50:50, about 60:40, about 70:30 and may be about 75:25.

Initial PAE Resin

In some aspects, the polyaminopolyamide-epihalohydrin resins suitable for use in the present invention comprise the water-soluble polymeric reaction product of epichlorohydrin and polyamide derived from polyalkylene polyamine and saturated aliphatic dibasic carboxylic acid containing from about 3 to about 10 carbon atoms. Resins of this type impart wet-strength to paper whether made under acidic, alkaline or neutral conditions. These resins are substantive to cellulosic fibers so that they may be economically applied thereto while the fibers are in dilute aqueous suspensions of the consistency used in paper mills.

In the preparation of the cationic resins contemplated for use herein, the dibasic carboxylic acid is first reacted with the polyalkylene polyamine, under conditions such as to produce a water-soluble polyamide containing the recurring groups

where n and x are each 2 or more and R is a divalent hydrocarbon of the dibasic carboxylic acid. The resulting water soluble polyamide is then reacted with epichlorohydrin to form the water-soluble cationic thermosetting resins.

The dicarboxylic acids contemplated for use in preparing the resins in the current process are saturated aliphatic dibasic carboxylic acids containing from 3 to 10 carbon atoms such as succinic, glutaric, adipic, azelaic and the like and saturated dibasic acids having from 4 to 8 carbon atoms in the molecule such as adipic and glutaric acids. Blends of two or more of the saturated dibasic carboxylic acids may also be used. A variety of polyalkylene polyamines including polyethylene polyamines, polypropylene polyamines, polybutylene polyamines, polypentylene polyamines, polyhexylene polyamines and so on and combinations thereof may be employed of which the polyethylene polyamines represent an economical class.

In another aspect of the invention, the polyalkylene polyamines contemplated for use may be represented as polyamines in which the nitrogen atoms are linked together by groups of the formula

where n is a small integer greater than unity and the number of such groups in the molecule ranges from two up to about eight. The nitrogen atoms may be attached to adjacent carbon atoms in the group —$C_nH_{2n}$— or to carbon atoms further apart, but not to the same carbon atom.

This invention contemplates not only the use of such polyamines as diethylenetriamine, triethylenetetramine, tetraethylenepentamine, and dipropylenetriamine, which can be obtained in reasonably pure form, but also mixtures and various crude polyamine materials. The term "polyalkylene polyamine" employed in the claims, therefore, refers to and includes any of the polyalkylene polyamines referred to above or to mixtures of polyalkylene polyamines and derivatives thereof.

In some aspects, it is desirable to increase the spacing of secondary amino groups on the polyamide molecule in order to change the reactivity of the polyamide-epichlorohydrin complex. This can be accomplished by substituting a diamine such as ethylenediamine, propylenediamine, hexamethylenediamine and the like for a portion of the polyalkylene polyamine. For this purpose, up to about 80% of the polyalkylene polyamine may be replaced with a molecularly equivalent amount of the diamine and can be about 50% or less.

In one aspect of the invention, an amine end-capped polyaminopolyamide (a.k.a., polyamide) may be used as described in U.S. Pat. No. 5,017,642, U.S. Pat. No. 6,908,983 and U.S. Pat. No. 7,175,740 to manufacture the starting resin.

In another aspect, a PAE resin for use in the base treatment process as outlined below can be a high solids, low viscosity PAE with low epihalohydrin by-products. In this aspect, a polyamide is reacted with a epihalohydrin at a temperature of from about 10° C. to about 100° C., or about 15° C. to about 50° C., or about 20° C. to about 45° C., until the viscosity for a 55% solids solution at 25° C. has reached an "S" or higher on the Gardner Holdt scale. Commercially available resins having similar viscosities as the claimed resin, would have an equivalent Gardner-Holdt of "A-2" at 20% solids. Therefore, in one aspect, the PAE resin of the present invention is lower in viscosity and molecular weight and higher in solids than the PAE generally used in the paper industry today.

In another aspect, the polyamide is reacted with the epichlorohydrin in an aqueous solution to moderate the reaction. In another aspect, the pH can be adjusted to increase or decrease the rate of crosslinking.

In one aspect, when the desired viscosity is reached, acid can be added to quench the reaction by reducing the pH of the reaction product and the resulting product is cooled to about 25° C. The resulting product is stabilized by adding sufficient acid to reduce the pH to at least about 6, or about 5, or about 4, or about 3. Any suitable acid or combination of acids, such as hydrochloric, sulfuric, nitric, formic, phosphoric, and acetic acid may be used to stabilize the product and may be hydrochloric acid and/or sulfuric acid.

In one aspect of the invention, after quenching the final or resulting resin with acid, gelation stability can be improved by heating the resulting resin and further lowering the pH with acid, which decreases the AZE level and increases the ACH level of the resin.

In another aspect of the invention the PAE resin is viscosity and functionally stable. Wherein viscosity stability is defined as the Brookfield viscosity increasing or decreasing less than 50% upon storage at 32° C. for 30 days, or less than a 30% change or less than a 20% change. Functionally stable is defined at having less than 40% change in any single functionality upon storage at 32° C. after 30 days, or less than 30% change or less than 20% change.

In another aspect of the invention, the resulting resin has a solids content of greater than 40%, can be greater than 50%, and may be greater than 55%. The Brookfield viscosity of the resin is dependent on the solids content. For a 55% to 57% solids PAE resin, the viscosity can be from about 400 centipoise (cP) to about 1,100 cP, can be from about 600 cP to about 1,000 cP, and may be from about 750 cP to about 850 cP when measured with a Brookfield viscometer at 25° C. The resin can also have a low concentration of epihalohydrin by-products, 1,3-dichloropropanol (1,3-DCP), and 3-chloropropanediol (3-CPD). The resin can have less than 10,000 ppm of 1,3-DCF at 55% solids, can have less than 5,000 ppm of 1,3-DCP at 55% solids, and may be less than 1,000 ppm 1,3-DCP at 55% solids.

In one aspect of the present invention, sufficient epihalohydrin should be used in the polyamide-epihalohydrin reaction, to convert most of the secondary amine groups to tertiary amine groups. However, more or less may be added to moderate or increase reaction rates. In general, when using epichlorohydrin, satisfactory results for achieving 1,3-DCP concentrations <1000 ppm may be obtained utilizing from about 0.70 moles to about 0.9 moles of epichlorohydrin for each mole of amine groups on the polyamide (as determined by amine number) can be from about 0.78 mole to about 0.85 moles epichlorohydrin for each mole of amine groups on the polyamide and may be from about 0.82 to about 0.84 moles of epichlorohydrin for each mole of amine groups on the polyamide. For resins with 1,3-DCP concentrations >1000 ppm the acceptable range may vary from about 0.85 moles to about 1.0 moles of epichlorohydrin for each mole of amine groups on the polyamide though higher levels of epichlorohydrin can be used.

To produce a REACH compliant, high solids, low viscosity PAE resin, the epihalohydrin can be reacted with an amine end-capped polyaminopolyamide (prepolymer), as described in U.S. Pat. No. 5,017,642 and U.S. Pat. No. 6,908,983, assigned to Hercules Incorporated and U.S. Pat. No. 7,175,740, assigned to Hercules Incorporated.

In some aspects of the present invention, the amine number for the prepolymer is greater than about 5.5 milliequivalents per dry gram of prepolymer, can be greater than about 6.0 milliequivalents per dry gram of prepolymer, and may be greater than about 6.25 milliequivalents per dry gram of prepolymer.

In other aspects, the initial resin has an RSV of less than about 0.25 dL/dry gram, can be less than about 0.20 dL/dry gram, can be less than about 0.15 dL/dry gram, can be less than about 0.13 dL/dry gram, can be less than about 0.12 dL/dry gram, and may be less than about 0.11 dL/dry gram.

For the PAE resins of the present invention, amine number is determined by dissolving the sample in a 1:1 ethylene glycol-isopropanol mixture. The resulting solution is titrated potentiometrically with 1 N hydrochloric acid (also in 1:1 EG-IPA) using a combination pH electrode.

Epichlorohydrin can be the epihalohydrin for use in the present process. Although the present teachings refer to epichlorohydrin specifically in certain instances, the person skilled in the art will recognize that these teachings apply to epihalohydrin in general.

In one aspect of the present invention, alkylation of the polyamide occurs rapidly proceeding to form secondary and tertiary amines depending on the relative amounts of epihalohydrin and polyamide. The levels of epihalohydrin and polyamide are such that between about 50% and 100% of the available amine nitrogen sites are alkylated to tertiary amines and levels can be between about 50% and about 95%, or between about 60% and about 90%, or between about 70% and about 85% alkylation of the amine nitrogen sites. Excess epihalohydrin beyond that required to fully alkylate all the amine sites to the tertiary amine is unnecessary because this can result in increased production of epihalohydrin byproducts.

After alkylation, the high solids, viscosity stable, REACH compliant PAE resins can have greater than 10 mole % secondary amine, or greater than 15 mole % secondary amine and greater than 20 mole % secondary amine functionality.

In one aspect of the invention, at least about 80% of the aminochlorohydrin present in the initial or starting resin has been converted into a resin having tertiary aminoepoxide functionality, can be at least about 90% and may be at least about 95%. However, in some instances up to about 100% of the aminochlorohydrin present in the initial or starting resin can be converted to a resin having tertiary aminoepoxide functionality.

It should be understood that the phrase "aminohalohydrin" as used in the present application can refer to secondary aminohalohydrin, tertiary aminohalohydrin and quaternary ammonium halohydrin unless otherwise specified.

It should also be understood that the phrase "epoxide" and "aminoepoxide" are used interchangeably throughout the present application and can refer to secondary aminoepoxide, tertiary aminoepoxide and quaternary ammonium epoxide unless otherwise specified.

Base Treatment

Both organic and inorganic bases can be used herein in the present invention. A base is defined as any proton acceptor (see Advanced Organic Chemistry, Third Ed.; Jerry March; John Wiley & Sons: New York, 1985, p 218-236, incorporated herein by reference.) Typical bases include alkali metal hydroxides, carbonates and bicarbonates, alkaline earth metal hydroxides, trialkylamines, tetraalkylammonium hydroxides, ammonia, organic amines, alkali metal sulfides, alkaline earth sulfides, alkali metal alkoxides and alkaline earth alkoxides. The base can be alkali metal hydroxides (lithium hydroxide, sodium hydroxide and potassium hydroxide) or alkali metal carbonates (sodium carbonate and potassium carbonate) and may be sodium hydroxide or potassium hydroxide.

The amount of base used in the treatment is dependent on a number of factors including, for example, azetidinium (AZE) and aminochlorohydrin (ACH) levels and the pH of the starting PAE resin. More base is generally used with higher ACH levels and/or a lower pH relative to a resin with lower ACH levels and/or a higher pH.

In some aspects of the present invention, the amount of base used in the treatment of the initial PAE can be from about 2.0 millimole per dry gram (mmole/dry g) to 10 mmole/dry gram, or from about 3.0 mmole per dry gram to 8 mmole/dry gram, or from about 4.0 mmole per dry gram to about 6 mmole/dry gram of resin.

In some aspects of the present invention, the pH can be from about 13.0 to about 10.0, or from about 13.0 to about 10.5, or from about 13.0 to about 11.0, or from about 12.5 to about 11.0, or from about 12.5 to about 11.5.

In some aspects of the present invention, the temperature of the aqueous solution of the starting resin can be at least 0° C., or at least about 15° C. or at least about 25° C., or at least about 30° C., or at least about 35° C., or at least about 40° C., or at least about 45° C., or at least about 60° C. The treatment conditions can be varied depending on the properties of the starting resin, such as the viscosity and aminohalohydrin content and the solids of the resins during the treatment process.

We have observed that high viscosity PAE resins can be base activated, but the resulting product has a viscosity that is too high to conveniently pump and ship at high solids. Therefore, in some aspects of the present invention, the reduced specific viscosity (RSV) of the starting resin should be less than 0.25 dL/dry gram, or less than 0.20 dL/dry gram, or less than 0.15 dL/dry gram, or less than 0.12 dL/dry gram. In yet other aspects of the invention, the molecular weight of the starting PAE resins can be less than about 50,000 Daltons, or less than about 40,000 Daltons, or less than about 30,000 Daltons, or less than about 20,000 Daltons, or less than about 10,000 Daltons.

An additional advantage of the specified low RSV and low molecular weight for the starting resin is that the low levels of by-products from the base activation process (epichlorohydrin and glycidol) are reduced to much lower levels than when a high RSV and high molecular weight starting resin is used. Without wishing to be bound by theory, the activation process to build molecular weight provides the conditions needed to further reduce these by-products.

In another aspect of the present invention, a high viscosity PAE resins is base activated, even though the resulting product would have a viscosity that would be too high to conveniently pump and ship at high solids.

In another aspect of the present invention, the molecular weight of the starting PAE resins can be greater than about 50,000 Daltons, or greater than about 100,000 Daltons, or greater than about 150,000 Daltons, or be greater than about 200,000 Daltons.

The resin treatment should continue until the reduced specific viscosity (RSV) is measured to be greater than about 0.30 dL/active gram, can be greater than about 0.35 dL/active gram, and may be greater than about 0.4 dL/active gram. The molecular weight of the treated PAE resins can be at least about 80,000 Daltons, can be at least about 100,000 Daltons, can be at least about 120,000 Daltons, can be at least about 140,000 Daltons, can be at least about 160,000 Daltons, can be at least about 180,000 Daltons, and may be at least about 200,000 Daltons.

For the PAE resins of the present invention, the average molecular weight (Mw) was determined by size exclusion chromatography (SEC). The sample was prepared in the mobile phase at a concentration of 2 milligram/milliliter (mg/ml) (dry basis of resin) and was stirred for 1-2 hours and filtered with a 0.45 micrometer (μm) PVDF syringe filter. The mobile phase was an aqueous solution of 0.22 molar (M) oxalic acid. The flow rate was 0.8 ml/minute. The following columns were used in series: Novema guard column+1 Novema 10000 Å+1 Novema 1000 Å+1 Novema 30 Å; 8.0 mm×300 mm. The column temperature was 40° C.

and the DRI detector temperature was 40° C. The calibration was relative to polyvinylpyridine standards with a narrow molecular weight distribution.

In some aspects of the present invention the initial water-soluble resin can be treated with a base for about 10 minutes to about 8 hours, or from about 20 minutes to 4 hours, or from about 60 minutes to about 4 hours, or from about 90 min to about 3 hours, or from about 120 minutes to about 3 hours.

The resin can be added to a papermaking process about 1 minute to about 24 hours after completion of the base treatment, can be from about 1 minute to about 8 hours, can be from about 1 minute to about 6 hours, and may be from about 1 minute to about 4 hours. While the activated resin can be stored for more than 24 hours, the performance will be less than when stored for 8 hours, for example.

In one aspect of the present invention, the active solids for base treatment can be at least about 7%, can be at least 8%, can be at least about 10%, and may be at least about 11% based upon the weight of the composition. In the context of the present invention the phrase "active solids" means the active polyaminopolyamide-epi and/or polyalkylene polyamine-epi of the composition. In another aspect of the present invention, the active solids for base treatment can be up to about 20%, can be up to about 18%, and may be up to about 15%.

Once the target viscosity is reached during the base treatment the reaction can be quenched via dilution with water to prevent gelation of the material. The actives concentration can be diluted to less than 7%, can be less than 6%, and may be less than 5%. It has been surprisingly discovered that the activated resin will not build viscosity at 6% or lower active solids, allowing temporary storage (e.g., less than 24 hours) without needing a large storage vessel relative to storage at 2% or lower active solids, for example.

The current process is useful in a wide range of paper applications including tissue, toweling, packaging and publication and laminating grades. The present invention is especially useful in food contact grades that need a high level of wet strength, including but not limited to toweling, milk and juice cartons, tea bag and coffee filter. The present invention is especially useful to provide paper products that are BfR compliant for food contact. The present invention is especially useful to provide paper products that have low AOX and can be defined as totally chloride free (TCF).

Paper Making

The process for making paper utilizing the resin compositions treated by the invention comprises: (a) providing an aqueous pulp suspension; (b) adding to the aqueous pulp suspension the resin and (c) sheeting and drying the aqueous pulp suspension produced in (b) to obtain paper.

The aqueous pulp suspension of step (a) of the process is obtained by means well known in the art, such as known mechanical, chemical and semi chemical, etc., pulping processes. Normally, after the mechanical grinding and/or chemical pulping step, the pulp is washed to remove residual pulping chemicals and solubilized wood components. Either bleached or unbleached pulp fiber may be utilized in the process of this invention. Recycled pulp fibers are also suitable for use.

In one aspect of the present invention, the treated resin can be added to the pulp slurry in a minimum amount of about 0.05 weight percent based on dry weight pulp, can be about 0.1 weight percent based on the dry weight of the pulp, can be about 0.2 weight percent, can be about 3 weight percent or higher and may be about 5 weight percent or higher based on dry weight pulp.

In other aspects of the invention a maximum amount of treated resin that can be added to the pulp slurry is about 3 weight percent, and can be about 1.5 weight percent. The resin composition is generally added in the form of an aqueous solution. In addition to the resin, other materials normally used in paper may be added as well. These include, for example, sizing agents, pigments, alum, brightening agents, dyes and dry strength agents, added in amounts well known in the art.

Products

The polyamine-epihalohydrin resins, and compositions thereof, prepared according to the processes of the present invention can be used to prepare compositions such as wet strength agents, dry strength agents, creping adhesives, and other adhesive compositions. These compositions can be used to prepare various paper products. As such, the present invention further relates to compositions, such as wet strength agents, dry strength agents, creping adhesives, and other adhesive compositions comprising polyamine-epihalohydrin resins, and compositions thereof, prepared according to the processes of the present invention. The present invention also relates to paper products comprising polyamine-epihalohydrin resins, and compositions thereof, prepared according to the processes of the present invention.

To have a highly effective resin, the mole % hydrolysis of total reactive functionality (azetidinium, epoxide and/or aminochlorohydrin) to glycol can be from 0% up to about 30%, can be up to about 20%, can be up to about 10% and may be up to about 2%. To build molecular weight, typically 2-10 mole % of the total reactive functionality is consumed.

In some aspect of the current method, the wet strength effectiveness of the treated resin of the present invention can be substantially increased by the base treatment relative to the initial water-soluble wet-strength resin. In the context of the present method this means that the treated resin will have at least about 150% of the effectiveness of the initial water-soluble wet-strength resin, can have at least about 175% and may have at least about 200% improvement over the initial water-soluble wet-strength resin.

The treatment conditions for each resin can be optimized to a given set of conditions, however, one skilled in the art will recognize that other conditions will also give good results. For example, if a shorter reaction time is desired, then a higher temperature could be used with good results.

Resin functionality was determined through $^1$H-NMR analysis. The PAE resin solution is prepared for analysis by mixing a small amount of resin in phosphoric acid buffered $D_2O$ (e.g., 0.050 gram of PAE resin at 20% concentration in 1 gram with phosphoric acid buffered $D_2O$). An FT-NMR spectrometer, equipped with an inverse BBI 5 mm probe, a $^1$H operating frequency of 400 MHz, or higher field, is required for this analysis. Electronic integration of the appropriate signals provides molar concentrations of the following alkylation components; ACH EPX, GLY, and AZE, where:

ACH=polymeric aminochlorohydrins
EPX=polymeric epoxides
GLY=polymeric glycols
AZE=azetidinium ions In the case of PAE resins based on adipic acid, the molar concentrations are relative to the adipic based —$CH_2$— signals. This method was optimized for the accuracy of AZE.

The following spectral parameters are standard experimental conditions for $^1$H NMR analysis of base treated Kymene resins.

| | |
|---|---|
| Temperature | 51° C. |
| Resonance Frequency | 400 MHz |
| # Data Points Acquired | 64K |
| Acquisition Time | 4 seconds |
| Sweep Width | 8278 Hz |
| Number of Scans | 16 |
| Relaxation Delay | 8 seconds |
| Pulse Tip Angle | 90 |
| Pulse Program* | zgcppr (composite pulse preset. - at low power) |
| Processed Spectral Size | 32K |
| Apodization Function | exponential |
| Line Broadening | 0.3 Hz |

Detailed PAE resin sample preparation for NMR analysis:
(1) Prepare ~1.5% solution of phosphoric acid in $D_2O$.
(2) Add the diluted phosphoric acid from (1) to 100 g of $D_2O$ until a pH of 3.0-3.5 is achieved about 10-20 drops) to provide phosphoric acid buffered $D_2O$.
(3) Weigh ~50 mg of the as-received PAE resin into a 5 cc vial.
(4) Add ~1 cc of phosphoric acid buffered $D_2O$ [(2) solution] into the same vial.
(5) Mix contents of the vial using a vortex mixer.
(6) Transfer the contents of the vial into a 5 mm NMR tube using a glass pipette.

Paper for testing was made on Hercules Continuous Papermaking System at pH 7.0 with 50:50 Rayonier bleached Kraft:James River bleached hardwood Kraft dry lap pulp refined to 500 ml Canadian standard freeness (CSF). Sheets were generated having 40 lb/3000 sq. ft. basis weight containing from 0.5% to 3.0% of treated resin (based on the solids of the initial water-soluble wet-strength resin). Natural aging refers to paper conditioned according to TAPPI Method T402. All paper tested had greater than two weeks natural aging at 50%±2% relative humidity and at 23° C.±1° C.

Dry tensile strength was determined using TAPPI Method T494. Wet tensile strength was determined using TAPPI Method T456 with a two hour soak time.

Herein, molecular weight may be expressed in terms of a material's reduced specific viscosity ("RSV") of 1% of a material in 1 M aqueous ammonium chloride at 25 degrees Celsius.

For the PAE resins of the present invention, RSV was determined using the following method. RSV of a 1% solution of the PAE resin in 1 M aqueous ammonium chloride was determined at 25 degrees Celsius by means of an Ubbelohde viscometer and a Cannon Polyvisc polymer viscosity instrument. Flow times of the 1% material solution and the pure solvent are measured and the relative viscosity (Nrel) calculated. The reduced specific viscosity is calculated from the relative viscosity. This method is based on ASTM D446.

EXAMPLES

Example 1—Synthesis of Polyaminopolyamide-epichlorohydrin resin (Table 1, Samples A-E)

A 1 L jacketed reaction vessel was fitted with a condenser, pH meter, and mechanical stirrer. To the flask was added 457.5 g (231 g solids) of 50.5% aqueous poly(adipic-co-diethylenetriamine) (Polymer 973, available from Solenis LLC) and 79.68 g deionized water (to give 43.0% solids). The solution was cooled to 20° C. and then 118.23 g of epichlorohydrin was added over 10 minutes. The temperature was allowed to rise to 40° C. and held there throughout the course of the reaction. After 3.5 hours at 40° C., approximately 44.59 g of concentrated sulfuric acid was added to adjust the pH to 3.0 (Total Solids equal 58.10%).

The data in Table 1, shows that the replicate samples of Example 1 have similar levels of azetidinium and molecular weight as measured by SEC and reduced viscosity.

Example 2—Base Activation of Polyaminopolyamide-epi Resin (Table 2)

A 2-liter, 4-necked flask was equipped with a condenser, a pH meter, and mechanical stirrer and placed in a circulating water bath set to maintain 40° C. To the flask was added 282.66 g (wet basis) of Example 1 and 553.02 g deionized water. Mechanical stirring was started and the solution was heated to 40° C. To this was added 658.09 g of 5% (wt/wt) aqueous sodium hydroxide (5 meq/g dry resin). The peak pH was 11.81. The reaction was allowed to proceed until the viscosity measuring device indicated a target viscosity of greater than 0.35 dL/g had been reached. At this time dilution water was added to the mixture to adjust the solids down to 5%.

Example 3—Base Treatment of Kymene® 920A Wet Strength Resin (Table 2)

A similar equipment configuration to Example 2 was used for the base treatment of Kymene® 920A wet-strength resin (available from Solenis LLC). To 500.97 g (wet basis) of Kymene® 920A resin (20% resin solids) was added 388.03 g deionized water. The solution was heated to 55° C. with a water bath. To the solution was injected 112.51 g of 10% (wt/wt) aqueous sodium hydroxide (2.8 meq/g dry resin). The pH was 9.90 after 5 minutes at which time the resin was cooled rapidly to room temperature.

Paper Making

Paper for testing was made on the Hercules Continuous Papermaking System at pH 7.0-7.5 with 50:50 Rayonier bleached Kraft:James River bleached hardwood Kraft dry lap pulp refined to 500 ml Canadian standard freeness. Sheets were generated having nominally 40 lb/3000 sq. ft. basis weight containing 0.5%-3.0% of treated resin (based on the solids of the initial water-soluble wet-strength resin). Natural aging refers to paper conditioned according to TAPPI Method T402. All paper tested had greater than two weeks natural aging at 50%±2% relative humidity and at 23° C.±1° C.

Dry tensile strength was determined using TAPPI Method T494. Wet tensile strength was determined using TAPPI Method T456 with a two hour soak time.

Properties of the Resins

Kymene®920A (Comparative Example 1)
66.3% AZE
14.1% ACH
11.7% Secondary Amines

TABLE 1

Polyaminopolyamide-epichlorohydrin resin (Example 1, Samples A-E)

| Sample | 1,3-DCP (ppm) | 3-CPD (ppm) | Solids (wt %) | AZE (mol %) | ACH (mol %) | 2° Amine (mol %) | RSV (dL/g) | Brookfiled (cP) | Mn (Daltons) | Mw (Daltons) |
|---|---|---|---|---|---|---|---|---|---|---|
| Sample A | 1108 | 353 | 58.05% | 19.7 | 63.9 | 23 | 0.104 | — | — | — |
| Sample B | 1009 | 328 | 59.66% | 19.9 | 66.2 | 22.2 | 0.105 | — | 2710 | 13660 |
| Sample C | 908 | 269 | 58.56% | 21.5 | 70.4 | 19.7 | 0.098 | 757 | 2636 | 12093 |
| Sample D | 1156 | 323 | 57.27% | 21.5 | 56.8 | 20.2 | 0.108 | 807 | 2733 | 15646 |
| Sample E | 1094 | 315 | 58.10% | 21.4 | 61.6 | 16.3 | 0.102 | 763 | 2586 | 12759 |

TABLE 2

Pilot Paper Machine Evaluation of Base Treated Resin (Paper was Naturally Aged)

| Example | % Resin Added | Basis Weight (lbs/3000 sq. ft.) | Caliper (mils) | Dry Tensile (lbs/in)[1] | Wet Tensile (lbs/in)[1] | % Wet/Dry Str. | Wet Strength %[2] |
|---|---|---|---|---|---|---|---|
| Blank | 0.0 | 46.8 | 4.25 | 16.93 | 0.24 | 1% | — |
| Example 1 | 0.5 | 42.2 | 3.92 | 17.46 | 1.37 | 8% | — |
| Example 1 | 1.0 | 42.4 | 3.98 | 18.40 | 1.76 | 10% | — |
| Example 1 | 1.5 | 42.5 | 3.99 | 18.00 | 2.13 | 12% | — |
| Example 1 | 2.0 | 42.5 | 3.84 | 17.78 | 2.44 | 14% | — |
| Example 1 | 2.5 | 42.7 | 3.84 | 18.51 | 2.65 | 14% | — |
| Example 1 | 3.0 | 42.7 | 3.93 | 18.24 | 2.64 | 14% | — |
| Comp. Ex 1 | 0.5 | 48.3 | 4.29 | 19.06 | 3.11 | 16% | — |
| Comp. Ex 1 | 1.0 | 43.9 | 3.99 | 19.37 | 3.86 | 20% | — |
| Comp. Ex 1 | 1.5 | 41.6 | 3.71 | 19.69 | 4.16 | 21% | — |
| Comp. Ex 1 | 2.0 | 41.8 | 3.75 | 19.87 | 4.19 | 21% | — |
| Comp. Ex 1 | 2.5 | 42.2 | 3.79 | 19.57 | 4.35 | 22% | — |
| Comp. Ex 1 | 3.0 | 42.4 | 3.84 | 19.88 | 4.56 | 23% | — |
| Example 2 | 0.5 | 41.9 | 3.64 | 18.87 | 2.89 | 15% | 211% |

TABLE 2-continued

Pilot Paper Machine Evaluation of Base Treated Resin (Paper was Naturally Aged)

| Example | % Resin Added | Basis Weight (lbs/3000 sq. ft.) | Caliper (mils) | Dry Tensile (lbs/in)[1] | Wet Tensile (lbs/in)[1] | % Wet/Dry Str. | Wet Strength %[2] |
|---|---|---|---|---|---|---|---|
| Example 2 | 1.0 | 41.8 | 3.63 | 20.54 | 3.85 | 19% | 219% |
| Example 2 | 1.5 | 42.0 | 3.64 | 21.51 | 4.54 | 21% | 213% |
| Example 2 | 2.0 | 41.9 | 3.65 | 21.49 | 5.03 | 23% | 207% |
| Example 2 | 2.5 | 42.1 | 3.65 | 22.77 | 5.46 | 24% | 206% |
| Example 2 | 3.0 | 42.4 | 3.84 | 22.58 | 5.60 | 25% | 212% |
| Example 3 | 0.5 | 42.4 | 3.91 | 19.02 | 3.12 | 16% | 100% |
| Example 3 | 1.0 | 42.7 | 3.89 | 20.26 | 4.14 | 20% | 107% |
| Example 3 | 1.5 | 43.2 | 3.96 | 20.33 | 4.66 | 23% | 112% |
| Example 3 | 2.0 | 42.5 | 3.90 | 20.63 | 4.69 | 23% | 112% |
| Example 3 | 2.5 | 42.4 | 3.91 | 19.97 | 4.82 | 24% | 111% |
| Example 3 | 3.0 | 42.6 | 4.03 | 20.62 | 5.10 | 25% | 112% |

[1]Wet and dry tensile strengths are reported as geometric means linearly normalized to a basis weight of 40 lbs/3000 sq. ft.
[2]Wet strength of paper made with base treated resin expressed as a percentage of the wet strength of paper made with initial water-soluble wet-strength resin at the same % resin added.

These results indicate that in one present method, the treated resin can impart a wet strength of at least 150% as great as that of the starting resin. For comparison, treated Kymene®920A wet-strength resin (example 3) provided 100-112% of the wet strength of the starting resin.

Example 4—Synthesis of Polyaminopolyamide-Epichlorohydrin Resin (Tables 3 and 4)

A 1 L round bottom flask was fitted with a condenser, pH meter, and mechanical stirrer. To the flask was added 757.84 g (377.02 g solids) of 49.75% aqueous poly(adipic-co-diethylenetriamine) (Polymer 973, available from Solenis LLC) and 118.92 g deionized water (to give 43.0% solids). To that mixture 192.96 g of epichlorohydrin was added all at once. The temperature was allowed to rise to 40° C. and held throughout the course of the reaction using a water bath. After 3.5 hours at 40° C., approximately 74.16 g of concentrated sulfuric acid was added to adjust the pH to 3.0 (Total Solids=54.62%). The viscosity as made was 575 cP. The resin was then aged at 25° C. and 32° C. The viscosity stability was measured using a Brookfield viscometer using a Brookfield LVDE at 60 rpm. The functional stability measured by NMR as outlined above (see Tables 3 and 4). As can been seen by the data in Tables 3-5, the resin has good functional and viscometric stability even when stored to 12 weeks at elevated temperature.

TABLE 3

Functionality of Example 4 upon aging at 25° C.

25° C. aging

| week | AZE | ACH | Glycol | Sec Amine |
|---|---|---|---|---|
| 0 | 20.6 | 49.2 | 10 | 21 |
| 2 | 23.2 | 49.4 | 10.7 | 20.4 |
| 4 | 23 | 52 | 10.9 | 20.8 |
| 6 | 22 | 53.8 | 11.1 | 21.4 |
| 8 | 21.1 | 55.8 | 11.5 | 21.6 |
| 10 | 20.5 | 56.9 | 12.1 | 21.6 |
| 12 | 19.6 | 57.5 | — | — |

TABLE 4

Functionality of Example 4 upon aging at 32° C.

32° C. aging

| week | AZE | ACH | Glycol | Sec Amine |
|---|---|---|---|---|
| 0 | 20.6 | 49.2 | 10 | 21 |
| 2 | 22.8 | 52.1 | 10.7 | 20.6 |
| 4 | 21.2 | 55.4 | 11.7 | 20.6 |
| 6 | 19.6 | 57.3 | 13.2 | 21.7 |
| 8 | 18 | 58.9 | 14.7 | 21.8 |
| 10 | 16.7 | 60 | 15.9 | 21.6 |
| 12 | 15.5 | 61 | — | — |

TABLE 5

Viscosity Stability, in centipoise, of Example 4 upon aging at 25° C. and 32° C.

| Temperature | Initial visc | 1 week | 2 weeks | 3 weeks | 4 weeks | 5 weeks | 6 weeks | 8 weeks | 10 weeks | 11 weeks | 12 weeks |
|---|---|---|---|---|---|---|---|---|---|---|---|
| 25° C. | 575 | 628 | 632 | 638 | 693 | 723 | 750 | 762 | 763 | 765 | 755 |
| 32° C. | 575 | 481 | 579 | 593 | 628 | 633 | 639 | 643 | 635 | 640 | 638 |

Example 5—Synthesis of Polyaminopolyamide-Epichlorohydrin Resin (Tables 6 and 7)

A 500 ml round bottom flask was fitted with a condenser, pH meter, and mechanical stirrer. To the flask was added 293.6 g (147.39 g solids) of 50.2% aqueous poly(adipic-co-diethylenetriamine) (Polymer 973, available from Solenis LLC) and 153.93 g deionized water (to give 43.0% solids after epichlorohydrin). To the room temperature solution 75.57 g of epichlorohydrin (Aldrich, 99%) was added over 10 minutes. The temperature was allowed to rise to 40° C. and held there for 3 hours. At that time the reaction was heated to 60° C. over the course of 45 minutes. The reaction was held at 60° C. for 10 minutes then quenched using 19.43 g of concentrated sulfuric acid to adjust the pH to 2.73. (Total Solids=46.6%, 167 cps, RSV=0.1227 dL/g).

Example 6—Base Activation of Polyaminopolyamide-Epi Resin

A 1 Liter 4 Necked Flask was equipped with a condenser, a pH meter, and mechanical stirrer and placed in a circulating water bath set to 40° C. To the flask was added 28.80 g (wet basis) of material similar to Example 1 and 4 above, having an initial RSV=0.1227 and 55.75 g deionized water. Mechanical stirring was started and the solution was heated to 40° C. To this was added 66.39 g of 5% (wt/wt) aqueous sodium hydroxide (5 meq/g dry resin). The reaction was allowed to proceed until the viscosity measuring device indicated a target viscosity of 0.4356 dL/g had been reached. At this time dilution water was added to the mixture to adjust the solids down to 1%.

Example 7—Base Activation of Polyaminopolyamide-Epi Resin

A 1 Liter 4 Necked Flask was equipped with a condenser, a pH meter, and mechanical stirrer and placed in a circulating water bath set to 40° C. To the flask was added 35.58 g (wet basis) of material similar to Example 5 above and 49.25 g deionized water. Mechanical stirring was started and the solution was heated to 40° C. To this was added 66.42 g of 5% (wt/wt) aqueous sodium hydroxide (5 meq/g dry resin). The reaction was allowed to proceed until the viscosity measuring device indicated a target viscosity of 0.3544 dL/g had been reached. At this time dilution water was added to the mixture to adjust the solids down to 1%.

Paper Making

Paper for testing was made on the dynamic handsheet former (TechPap) with 50:50 Rayonier bleached Kraft from James River bleached hardwood Kraft dry lap pulp refined to approximately 500 ml Canadian standard freeness. Sheets were generated having nominally 20 lb/3000 sq. ft. basis weight containing 0.5% or 1.0% of treated resin (based on the solids of the initial water-soluble wet-strength resin). The resin was added to the thick stock (about 1%) and mixed for 100 seconds followed by the addition, if applicable, of carboxymethylcellulose (CMC 7MCT, available from Ashland Inc.) and mixed for an additional 100 seconds. The CMC was added in a ratio of 3 to 1 resin to CMC. The dynamic handsheet former was operated at 900 m/min and 1.6 bar pulp pump pressure. Sheets were dried on the 115° C. drum dryer for 10-15 minutes. Natural aging refers to paper conditioned according to TAPPI Method T402. All paper tested had greater than two weeks natural aging at 50%±2% relative humidity and at 23° C.±1° C.

Dry tensile strength was determined using TAPPI Method T494. Wet tensile strength was determined using TAPPI Method T456 with a two hour soak time. Results for Example 6 and Example 7 can be seen in Table 6 and Table 7, respectively.

TABLE 6

Dynamic Handsheet Former Evaluation of Base Treated Resin (Example 6 compared with Example 4)

| Example | % Resin Added | Basis Weight (lbs/3000 sq. ft.) | Wet Tensile (lbs/in)[1] | Dry Tensile (lbs/in)[1] | % Wet/Dry Str. | Wet Strength Improvement %[2] |
|---|---|---|---|---|---|---|
| Blank | 0.00% | 18.95 | 0.14 | 3.07 | 5% | — |
| Example 4 with CMC | 0.50% | 18.42 | 0.52 | 3.02 | 18% | — |
| Example 4 with CMC | 1.00% | 18.59 | 0.81 | 4.30 | 19% | — |
| Example 6 with CMC | 0.50% | 19.41 | 0.62 | 4.06 | 15% | 118% |
| Example 6 with CMC | 1.00% | 18.08 | 0.82 | 4.46 | 18% | 102% |
| Example 4 | 0.50% | 19.34 | 0.41 | 3.50 | 12% | — |
| Example 4 | 1.00% | 19.63 | 0.63 | 3.77 | 17% | — |
| Example 6 | 0.50% | 19.87 | 0.71 | 4.02 | 18% | 172% |
| Example 6 | 1.00% | 19.61 | 0.86 | 4.23 | 20% | 138% |

[1]Wet and dry tensile strengths are reported as geometric means linearly normalized to a basis weight of 20 lbs/3000 sq. ft.
[2]Wet strength of paper made with treated resin expressed as a percentage of the wet strength of paper made with the initial water-soluble wet-strength resin at the same % resin added.

TABLE 7

Dynamic Handsheet Former Evaluation of Base Treated Resin (Example 7 compared to Example 5)

| Example | % Resin Added | Basis Weight (lbs/3000 sq. ft.) | Dry Tensile (lbs/in)[1] | Wet Tensile (lbs/in)[1] | % Wet/Dry Str. | Wet Strength Improvement %[2] |
|---|---|---|---|---|---|---|
| Blank | 0.00% | 15.06 | 2.05 | 0.21 | 10% | — |
| Example 5 with CMC | 0.50% | 14.82 | 2.87 | 0.55 | 19% | — |
| Example 5 with CMC | 1.00% | 15.45 | 3.45 | 0.81 | 24% | — |
| Example 7 with CMC | 0.50% | 15.65 | 3.20 | 0.61 | 19% | 112% |
| Example 7 with CMC | 1.00% | 15.48 | 3.59 | 0.83 | 23% | 135% |
| Example 5 | 0.50% | 15.35 | 2.61 | 0.39 | 15% | — |
| Example 5 | 1.00% | 17.20 | 2.81 | 0.51 | 18% | — |
| Example 7 | 0.50% | 16.35 | 3.03 | 0.60 | 20% | 152% |
| Example 7 | 1.00% | 16.57 | 3.16 | 0.72 | 23% | 142% |

[1]Wet and dry tensile strengths are reported as geometric means linearly normalized to a basis weight of 15 lbs/3000 sq. ft.
[2]Wet strength of paper made with treated resin expressed as a percentage of the wet strength of paper made with the initial water-soluble wet-strength resin at the same % resin added.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A process of making paper having higher wet strength comprising:
   providing an aqueous solution of at least 8% solids of an initial water-soluble wet-strength resin having an RSV of less than about 0.25 dL/dry gram selected from the group consisting of polyaminopolyamide-epihalohydrin resins, polyalkylene polyamine-epihalohydrin resins, and mixtures thereof,
   treating the aqueous solution with a base to a pH of from about 13.0 to about 11.0, at a temperature of from about 30° C. to about 60° C. for from about 20 minutes to about 4 hours, thereby forming an aqueous solution of a treated resin, wherein the resin has an RSV of greater than about 0.35 dL/g, and wherein at least about 95% of the tertiary aminohalohydrin present in the starting resin is converted to epoxides; and
   adding the treated resin to a papermaking furnish.

2. The process of claim 1, wherein the initial water-soluble wet-strength resin having an RSV of less than about 0.15 dL/dry gram.

3. The process of claim 1, wherein the initial water-soluble resin is a polyaminopolyamide-epichlorohydrin resin.

4. The process of claim 1, wherein the wet strength resin comprises from about 10 mole % to about 40 mole % azetidinium ions and from about 60 mole % to about 90 mole % tertiary aminohalohydrin.

5. The process of claim 1, wherein the starting resin has a 1,3-dichloropropanol level of less than 1000 ppm.

6. The process of claim 1, wherein treatment of the initial water-soluble wet-strength resin with base is from about 2.0 mmole/dry gram to about 10 mmole/dry gram of initial resin.

7. The process of claim 6, wherein treatment of the initial water-soluble wet-strength resin with base is from about 3.0 mmole per dry gram to 8 mmole/dry gram of initial resin.

8. The process of claim 1, wherein the treated resin can be added to the pulp slurry in an amount of from about 0.05 weight percent based on dry weight of the pulp to about 5 weight percent of dry pulp.

9. The process of claim 8, wherein the treated resin can be added to the pulp slurry in an amount of about 0.1 weight percent of dry weight pulp to about 3 weight percent dry weight pulp.

10. The process of claim 1, wherein the initial PAE resin has a solids content of greater than 40%.

11. The process of claim 10, wherein the initial PAE resin has a solids content of greater than 50%.

12. The process of claim 1, wherein the ratio of ACH:AZE can be about 30:70 to about 75:25.

13. The process of claim 1, wherein the treated resin is added to the paper furnish process about 1 minute to about 24 hours after completion of the base treatment.

14. The process of claim 1, wherein the initial water-soluble wet-strength resin has an RSV of less than about 0.25 dL/dry gram.

15. The process of claim 14, wherein the water-soluble wet-strength resin has an RSV of less than about 0.15 dL/dry gram.

16. The process of claim 1, wherein the amount of treated resin added to the papermaking furnish is from about 0.25% to about 1.75% dry weight pulp furnish.

17. The process of claim 16, wherein the amount of treated resin added to the papermaking furnish is from about 0.5% to about 1.5% dry weight pulp furnish.

18. The process of claim 17, wherein the amount of treated resin added to the papermaking furnish is from about 0.75% to about 1.25% dry weight pulp furnish.

19. The process of claim 1, wherein the treated resin has at least about 150% to about 200% of the effectiveness of the initial water-soluble wet-strength resin.

* * * * *